(12) United States Patent
Takaori et al.

(10) Patent No.: US 10,137,692 B2
(45) Date of Patent: Nov. 27, 2018

(54) WATER-BASED CLEANING LIQUID FOR INKJET RECORDING APPARATUS USE AND CLEANING METHOD

(71) Applicant: KYOCERA Document Solutions Inc., Osaka (JP)

(72) Inventors: Yasuko Takaori, Osaka (JP); Noriaki Ozawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/806,414

(22) Filed: Nov. 8, 2017

(65) Prior Publication Data

US 2018/0147851 A1 May 31, 2018

(30) Foreign Application Priority Data

Nov. 29, 2016 (JP) ................... 2016-231108

(51) Int. Cl.
*B41J 2/165* (2006.01)
*C09D 9/04* (2006.01)

(52) U.S. Cl.
CPC ....... *B41J 2/16552* (2013.01); *B41J 2/16535* (2013.01); *B41J 2/16538* (2013.01); *B41J 2/16585* (2013.01); *C09D 9/04* (2013.01); B41J 2002/16558 (2013.01)

(58) Field of Classification Search
CPC ............... B41J 2/16552; B41J 2/16538; B41J 2/16585; B41J 2/16535; B41J 2002/16558; C09D 9/04
See application file for complete search history.

(56) References Cited

U.S. PATENT DOCUMENTS

| | | | |
|---|---|---|---|
| 2012/0327156 A1* | 12/2012 | Aruga | B41J 3/4078 347/20 |
| 2015/0077465 A1* | 3/2015 | Haijima | C11D 1/72 347/21 |
| 2015/0258796 A1* | 9/2015 | Tamai | B41J 2/16552 347/28 |
| 2017/0275561 A1 | 9/2017 | Sato et al. | |

FOREIGN PATENT DOCUMENTS

JP 2016-060156 A 4/2016

* cited by examiner

*Primary Examiner* — Henok Legesse
(74) *Attorney, Agent, or Firm* — Studebaker & Brackett PC (57) ABSTRACT

A water-based cleaning liquid for inkjet recording apparatus use contains at least 0.10% by mass and no greater than 10.00% by mass of a nonionic surfactant, at least 0.50% by mass and no greater than 30.00% by mass of a deliquescent agent, and a pH adjuster. The nonionic surfactant contains polyoxyalkylene alkylamine. The deliquescent agent includes at least one of sorbitol, trimethylolpropane, and 1,3-bis(2-hydroxyethyl)-5,5-dimethylhydantoin. The pH adjuster includes an alkali metal salt. The water-based cleaning liquid for inkjet recording apparatus use has a pH of at least 7.5 and no greater than 8.5.

6 Claims, 2 Drawing Sheets

WATER-BASED CLEANING LIQUID FOR INKJET RECORDING APPARATUS USE AND CLEANING METHOD

INCORPORATION BY REFERENCE

The present application claims priority under 35 U.S.C. § 119 to Japanese Patent Application No. 2016-231108, filed on Nov. 29, 2016. The contents of this application are incorporated herein by reference in their entirety.

BACKGROUND

The present disclosure relates to a water-based cleaning liquid for inkjet recording apparatus use and cleaning method.

Some water-based cleaning liquid for inkjet recording apparatus use is used for cleaning a part of a recording head to which a water-based ink for inkjet recording (also referred to below simply as a "water-based ink") tends to be attached. The cleaning liquid contains a zwitterionic surfactant and has a pH of at least 9 and no greater than 12.

SUMMARY

A water-based cleaning liquid for inkjet recording apparatus use according to the present disclosure contains at least 0.10% by mass and no greater than 10.00% by mass of a nonionic surfactant, at least 0.50% by mass and no greater than 30.00% by mass of a deliquescent agent, and a pH adjuster. The nonionic surfactant contains polyoxyalkylene alkylamine. The deliquescent agent includes at least one of sorbitol, trimethylolpropane, and 1,3-bis(2-hydroxyethyl)-5,5-dimethylhydantoin. The pH adjuster includes an alkali metal salt. The water-based cleaning liquid for inkjet recording apparatus use has a pH of at least 7.5 and no greater than 8.5.

A cleaning method according to the present disclosure is a method for cleaning a discharge surface of a recording head included in an inkjet recording apparatus. The cleaning method according to the present disclosure includes: supplying the water-based cleaning liquid for inkjet recording apparatus use having the above configuration to the discharge surface; performing purging in a manner that a water-based ink for inkjet recording is pressurized to be discharged from the discharge surface; and wiping the discharge surface. The discharge surface is a surface from which the water-based ink for inkjet recording has been discharged. The supplying and the purging are performed before the wiping.

DETAILED DESCRIPTION

The following describes an embodiment of the present disclosure. Note that unless otherwise stated, evaluation results (for example, values indicating shape or physical properties) of a powder each are a number average of values measured for an appropriate number of particles of the powder. A measured value of a volume median diameter ($D_{50}$) of a powder is a value measured based on Coulter principle (an electric sensing zone method) using "Coulter Counter Multisizer 3" produced by Beckman Coulter, Inc., unless otherwise stated.

Also note that in the present description the term "-based" may be appended to the name of a chemical compound in order to form a generic name encompassing both the chemical compound itself and derivatives thereof. When the term "-based" is appended to the name of a chemical compound used in the name of a polymer, the term indicates that a repeating unit of the polymer originates from the chemical compound or a derivative thereof. In the present description, the term "(meth)acryl" is used as a generic term for both acryl and methacryl.

[Water-Based Cleaning Liquid for Inkjet Recording Apparatus Use According to Present Embodiment]

A water-based cleaning liquid for inkjet recording apparatus use according to the present embodiment (also referred to below simply as a "water-based cleaning liquid") contains at least 0.10% by mass and no greater than 10.00% by mass of a nonionic surfactant, at least 0.50% by mass and no greater than 30.00% by mass of a deliquescent agent, and a pH adjuster. The nonionic surfactant contains polyoxyalkylene alkylamine. The deliquescent agent includes at least one of sorbitol, trimethylol propane, and 1,3-bis(2-hydroxyethyl)-5,5-dimethylhydantoin. The pH adjuster includes an alkali metal salt. The water-based cleaning liquid has a pH of at least 7.5 and no greater than 8.5. The pH of the water-based cleaning liquid is preferably measured by a method employed in Examples described later or a method equivalent thereto. A nonionic surfactant containing polyoxyalkylene alkylamine is also referred to below as a "nonionic surfactant A".

In a situation in which an image is formed using an inkjet recording apparatus, inkjet recording ink (also referred to below simply as "ink") is discharged from a discharge surface of a recording head toward a recording medium. More specifically, the ink is discharged from multiple discharge ports formed in the discharge surface toward the recording medium. By doing so, the discharge surface may be contaminated with the ink. A solvent component contained in the water-based ink tends to evaporate more readily than that contained in a non-water-based ink. As such, the water-based ink is more readily dried on the discharge surface than the non-water-based ink, and therefore, tends to readily adhere to the discharge surface.

When the ink adheres to the discharge surface, the ink adhering thereto (also referred to below as "adhering ink") may block the discharge ports. As a result, ink discharge failure may occur. For example, ink is hardly discharged. Alternatively, ink may be discharged in an undesired discharge direction. Occurrence of ink discharge failure may decline image quality. In view of the foregoing, prevention of occurrence of ink discharge failure is demanded. It is proposed for example to prevent occurrence of ink discharge failure by cleaning the discharge surface with a cleaning liquid.

The following method can be employed for example as a method for cleaning the discharge surface with a cleaning liquid. Specifically, the cleaning liquid is first supplied to the discharge surface and a purging operation is performed. The purging operation may be performed after supply of the cleaning liquid to the discharge surface. Alternatively, the cleaning liquid may be supplied to the discharge surface after the purging operation. The ink is pressurized to be discharged from the discharge ports in the purging operation. Ink discharged in the purging operation will be referred to below as "purged ink". Thereafter, a wiping operation is performed. The discharge surface is wiped in the wiping operation. The discharge surface is preferably a surface of the recording head from which ink has been discharged. In other words, the discharge surface is preferably cleaned after ink is discharged from the discharge surface.

The wiping operation results in part of the cleaning liquid remaining yet on the discharge surface. In a situation in which no ink is discharged for a long period of term in a state in which part of the cleaning liquid remains on the discharge surface, the part of the cleaning liquid may be dried on and adhere to the discharge surface. The phrase "no ink is discharged for a long period of term" herein refers to a situation in which ink is not discharged from the discharge surface for a long period of term (for example, three or more days) after the wiping operation is performed.

Once the cleaning liquid adheres to the discharge surface, the cleaning liquid adhering thereto (also referred to below as "adhering cleaning liquid") may block the discharge ports. Ink discharge failure may occur also for the reason as above. As described above, even when the discharge surface is cleaned with the cleaning liquid, ink discharge failure may occur when ink discharge is restarted. The phrase "when ink discharge is restarted" herein refers to a situation in which ink discharge from the discharge surface from which no ink has been discharged for a long period of term (for example, three or more days) is tried.

In view of the foregoing, the water-based cleaning liquid according to the present embodiment has the aforementioned features. Therefore, when the discharge surface of the recording head is cleaned with the water-based cleaning liquid according to the present embodiment, occurrence of discharge failure can be prevented even when ink discharge is restarted. The following first describes a typical configuration of the water-based ink and an adhering ink forming process in order for the sake of explanation.

<Typical Configuration of Water-Based Ink>

The water-based ink contains an aqueous solvent and a pigment dispersion. The pigment dispersion refers to a plurality of pigment particles dispersed in the aqueous solvent. The pigment particles each include a pigment core containing a pigment and a resin cover disposed over a surface of the pigment core. The water-based ink as above is preferably discharged from the discharge surface of the recording head toward a recording medium.

The pigment particles are dispersed in the water-based ink. Specifically, a resin salt is usually used as a material of the resin covers. The resin salt herein has within a molecule thereof a functional group capable of being ionized, for example, a COONa group. The water-based ink contains a sufficient amount of the aqueous solvent. For the reasons as above, electrolytic dissociation tends to readily occur on the surfaces of the resin covers. An electric dual layer is accordingly formed on the surfaces of the resin covers. In a configuration for example in which a resin salt having a COONa group within a molecule thereof is used as a material of the resin covers, the surfaces of the resin covers are negatively charged (COO$^-$) and Na$^+$ is accordingly attached to the surfaces of the resin covers by electric attraction. When the electric dual layer is formed on the surface of each resin cover, the pigment particles electrically repel one another. As a result, the pigment particles are dispersed.

<Adhering Ink Forming Process>

The adhering ink is thought to be formed through the following process.

When the water-based ink is discharged from the discharge surface of the recording head toward a recording medium, the water-based ink may be attached to the discharge surface. When the water-based ink is attached to the discharge surface, the water-based ink comes in contact with the air to be dried. When the water-based ink is dried, the resin covers tend to form a film.

Specifically, when the water-based ink is dried, the amount of the aqueous solvent in the water-based ink decreases, with a result that electrolytic dissociation hardly occurs on the surfaces of the resin covers. In such a situation, the pigment particles hardly repel one another and accordingly tend to agglomerate together. Typically, the pigment particles each include a pigment core and a resin cover disposed over the surface of the pigment core (see <Typical Configuration of Water-based Ink> described above). In the above configuration, when the pigment particles agglomerate together, the resin covers present on the respective surfaces of different pigment cores tend to be in contact with one another. As a result, a film of the resin covers (also referred to below as a "resin film") tends to be formed. As described above, when the water-based ink is dried, agglomerate of the pigment cores is covered with the resin film. Thus, the adhering ink is formed.

<Reason why Specific Advantages can be Obtained

Factors will be described that can be thought as reasons why specific advantages can be obtained when the discharge surface of the recording head is cleaned with the water-based cleaning liquid according to the present embodiment. The "specific advantages" herein include an advantage of preventing occurrence of discharge failure even in restart of ink discharge.

The water-based cleaning liquid according to the present embodiment contains an alkali metal salt as the pH adjuster. In the above configuration, the pH adjuster tends to ionize into alkali metal ions and anionic ions in the water-based cleaning liquid. For the reason as above, adhering ink is hardly formed.

Specifically, as described above in <Adhering Ink Forming Process>, once the water-based ink is dried on the discharge surface, adhering ink is formed. However, the water-based cleaning liquid is thought to be supplied during the course of formation of adhering ink in many cases. As described above in <Typical Configuration of Water-based Ink>, ionization tends to occur on the surfaces of the resin covers in the presence of a sufficient amount of the aqueous solvent. Therefore, ionization readily occurs on the surfaces of the resin covers when the water-based cleaning liquid is supplied to the discharge surface during the course of formation of adhering ink. In a configuration for example in which the resin salt has a COONa group within a molecule thereof, the surfaces of the resin covers are negatively charged (COO$^-$) and Na$^+$ is accordingly attached to the surfaces of the resin covers by electric attraction.

The pH adjuster in the present embodiment tends to ionize into alkali metal ions and anionic ions in the water-based cleaning liquid. Therefore, when the water-based cleaning liquid is supplied to the discharge surface during the course of formation of adhering ink, not only metal ions ionized from the resin salt but also the alkali metal ions ionized from the pH adjuster are attached to the surfaces of the resin covers by electric attraction. Thus, comparatively large electric repulsion works among pigment particles. The pigment particles accordingly tend to disperse. As a result, adhering ink is hardly formed (see <Adhering Ink Forming Process> above).

As described above, adhering ink is hardly formed in the present embodiment. Therefore, liquid (for example, water-based cleaning liquid or purged ink) can permeate among adjacent pigment particles.

The water-based cleaning liquid according to the present embodiment contains the nonionic surfactant A. Recently, the inventors studied relationship between materials of a surfactant contained in a water-based cleaning liquid and solubility of adhering ink. As a result of the study, the inventors have found that when a water-based cleaning liquid contains the nonionic surfactant A, adhering ink can be readily removed from the discharge surface (see Evaluation 1 described later). The inventors infer the following as a reason why the result as above have been achieved. The nonionic surfactant A more readily permeates among adjacent pigment particles than any other surfactants. Therefore, the water-based cleaning liquid according to the present embodiment more readily permeates among adjacent pigment particles than a water-based cleaning liquid containing a surfactant different from the nonionic surfactant A. Here, "any other surfactants" and "a surfactant different from the nonionic surfactant A" each include a nonionic surfactant different from the nonionic surfactant A, a cationic surfactant, an anionic surfactant, and a zwitterionic surfactant.

In addition, the water-based cleaning liquid according to the present embodiment has a pH of at least 7.5 and no greater than 8.5. A water-based ink may usually be weakly basic. Further, the purged ink is a water-based ink. From the above, when the water-based cleaning liquid has a pH of at least 7.5 and no greater than 8.5, the water-based cleaning liquid exhibits high affinity to the purged ink (water-based ink). When the water-based cleaning liquid is supplied to the discharge surface and the purging operation is performed, the purged ink tends to permeate among adjacent pigment particles together with the water-based cleaning liquid.

The water-based cleaning liquid according to the present embodiment contains the deliquescent agent. The deliquescent agent herein, which is deliquescent, tends to absorb moisture to be liquefied. For the reasons as above, when the water-based cleaning liquid is supplied to the discharge surface and the purging operation is performed, the purged ink (water-based ink) is readily absorbed into the deliquescent agent. When the water-based cleaning liquid permeates among adjacent pigment particles, the purged ink absorbed into the water-based cleaning liquid (specifically, purged ink absorbed into the deliquescent agent contained in the water-based cleaning liquid) can readily permeate among adjacent pigment particles.

As described above, the purged ink readily permeates among adjacent pigment particles in the present embodiment. Accordingly, when the water-based cleaning liquid is supplied to the discharge surface and the purging operation is performed, the adhering ink is readily dissolved into the purged ink. As such, when the wiping operation is performed after the water-based cleaning liquid is supplied to the discharge surface and the purging operation is performed, the adhering ink can be easily removed from the discharge surface.

The water-based cleaning liquid according to the present embodiment further contains the deliquescent agent. The water-based cleaning liquid can accordingly be prevented from being dried on the discharge surface during the wiping operation. As a result, impairment of adhering ink wiping performance can be inhibited in the wiping operation. This can achieve efficient removal of the adhering ink from the discharge surface.

As describe above, the adhering ink can be removed from the discharge surface through the wiping operation after the water-based cleaning liquid is supplied to the discharge surface and the purging operation is performed. As a result, a situation in which ink discharge is restarted in a state in which the adhering ink is attached to the discharge surface can be prevented. Consequently, occurrence of ink discharge failure can be prevented even in restart of ink discharge.

In addition, the water-based cleaning liquid in the present embodiment, which contains the deliquescent agent, can be prevented from being dried on the discharge surface. Thus, adhesion of the water-based cleaning liquid to the discharge surface can be inhibited even in a situation in which part of the water-based cleaning liquid remains on the discharge surface after the wiping operation. As such, formation of adhering cleaning liquid can be inhibited, which can result in prevention of the discharge port from being blocked with the adhering cleaning liquid. Occurrence of ink discharge failure in restart of ink discharge can be prevented also by the above factor.

The water-based cleaning liquid can be used for cleaning not only the discharge surface but also a blade or a conveyance roller used in the wiping operation. The phrase "cleaning the discharge surface" herein includes removal of adhering ink from the discharge surface.

Inks include a water-based ink and a non-water-based ink. The water-based ink herein contains an aqueous solvent. By contrast, the non-water-based ink usually contains no aqueous solvent. For the reason as above, the water-based cleaning liquid exhibits high affinity to the water-based ink but hardly exhibits high affinity to the non-water-based ink. The adhering ink is more readily removed from the discharge surface when the discharge surface is cleaned with the water-based cleaning liquid according to the present embodiment after the water-based ink rather than the non-water-based ink is discharged from the discharge surface. Therefore, it is preferable to clean the discharge surface with the water-based cleaning liquid according to the present embodiment in a situation in which an image is formed with the water-based ink.

A cleaning method according to the present embodiment is a method for cleaning the discharge surface of the recording head. More specifically, the cleaning method according to the present embodiment includes supplying, purging, and wiping. In the supplying, the water-based cleaning liquid according to the present embodiment is supplied to the discharge surface. In the purging, the purging operation is performed. More specifically, the water-based ink (purged ink) is pressurized to be discharged from the discharge surface. In the wiping, the wiping operation is performed. More specifically, the discharge surface is wiped. The supplying and the purging are performed before the wiping. It is possible that the purging is performed after the supplying and then the wiping is performed. Alternatively, it is possible that the supplying is performed after the purging and then the wiping is performed. The water-based cleaning liquid is that described above in [Water-based cleaning liquid for inkjet recording apparatus use According to Present Embodiment]. Therefore, when the discharge surface of the recording head is cleaned according to the cleaning method according to the present embodiment, an image can be formed without involving occurrence of ink discharge failure even in restart of ink discharge.

<Supplying>

As described above, the water-based cleaning liquid in the present embodiment is supplied to the discharge surface in the supplying. Examples of a method for supplying the water-based cleaning liquid include discharging the water-based cleaning liquid by an inkjet method, applying the water-based cleaning liquid using a roller, and spraying the water-based cleaning liquid.

Note that the supplying is preferably performed after discharging. In the discharging, the water-based ink is discharged from the discharge surface toward a recording medium. The discharging can be performed through image formation using an inkjet recording apparatus loaded with the water-based ink.

<Purging and Wiping>

Once image formation is performed using the inkjet recording apparatus loaded with the water-based ink, the purging and the wiping may be performed. The purging is preferably performed after the discharging.

[Example of Cleaning Method According to Present Embodiment]

Figure 1:
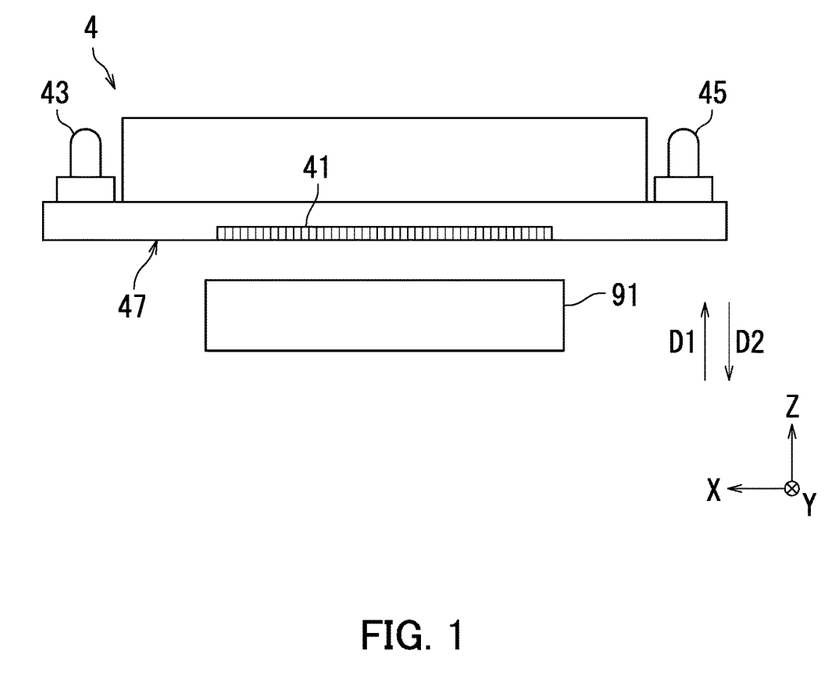
FIG. 1 is an illustration explaining a step of a cleaning method according to the present disclosure.
Figure 2:
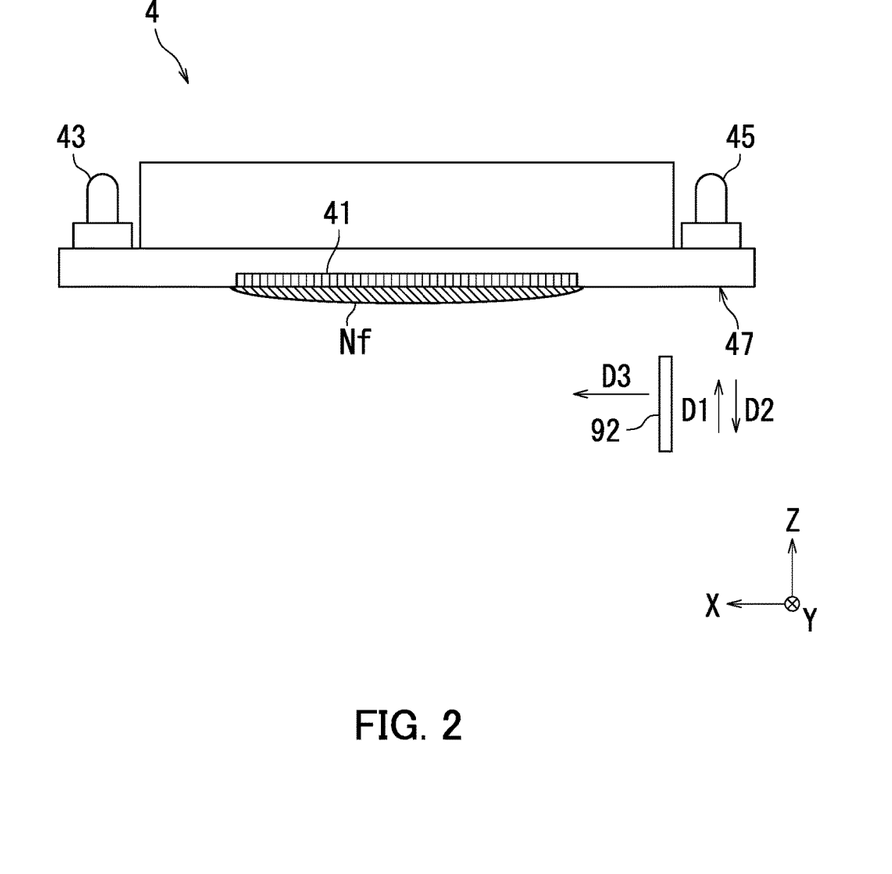
FIG. 2 is an illustration explaining another step of the cleaning method according to the present disclosure.

An example of the cleaning method according to the present embodiment will be described in detail below with reference to FIGS. 1 and 2. FIG. 1 is an illustration explaining a step of the cleaning method according to the present embodiment, and more specifically, explaining the supplying. FIG. 2 is an illustration explaining another step of the cleaning method according to the present embodiment, and more specifically, explaining the purging operation and the wiping operation. The X axis, the Y axis, and the Z axis in each of FIGS. 1 and 2 are perpendicular to one another.

The water-based ink is discharged from a discharge surface 47 of a recording head 4 toward a recording medium first in the cleaning method illustrated in FIGS. 1 and 2. The recording head 4 herein includes nozzles 41, an ink inlet 43, and an ink outlet 45, as illustrated in FIGS. 1 and 2. The recording head 4 has the discharge surface 47. The nozzles 41 each are open in the discharge surface 47 and discharge the water-based ink toward a recording medium. The water-based ink flows into the recording head 4 through the ink inlet 43 and flows out from the recording head 4 through the ink outlet 45.

When the water-based ink is discharged from the discharge surface 47 of the recording head 4 toward the recording medium, the water-based ink may be attached to the discharge surface 47. When the water-based ink is attached to the discharge surface 47, the water-based ink comes in contact with the air to form adhering ink (not illustrated). In view of the foregoing, the supplying, the purging, and the wiping are performed after the discharging.

The supplying will be described with reference to FIG. 1. A sponge 91 is caused to be impregnated with the water-based cleaning liquid first in the supplying. Next, the sponge 91 is moved to a position opposite to the discharge surface 47 and then moved in an ascending direction D1 to be pressed against the discharge surface 47. It is preferable that a state in which the sponge 91 is pressed against the discharge surface 47 (also referred to below as a "state of the sponge 91 being pressed") is kept for a specific time period. Alternatively, the sponge 91 may be moved in the ascending direction D1 and a descending direction D2 in a reciprocal manner while being kept in the state of the sponge 91 being pressed. Or, the sponge 91 may be moved in a direction along the discharge surface (X direction in FIG. 1) while being kept in the state of the sponge 91 being pressed. The ascending direction D1 herein refers to a direction toward the discharge surface 47 in the Z direction. The descending direction D2 refers to a direction away from the discharge surface 47 in the Z direction.

After elapse of the specific time period, the sponge 91 is moved in the descending direction D2. Then, the supplying ends. After the supplying, the purging is performed.

The purging will be described with reference to FIG. 2. In the purging, the purging operation is performed. In the purging operation, the recording head 4 performs purging. This causes purged ink Nf to be forcedly discharged from the discharge surface 47 (more specifically, the openings of the nozzles 41). After the purging, the wiping is performed.

The wiping will be described with reference to FIG. 2. In the wiping, the wiping operation is performed. In the wiping operation, a blade 92 is moved to a position opposite to the discharge surface 47 and then moved in the ascending direction D1 to be pressed against the discharge surface 47. The blade 92 is then moved in a direction along the discharge surface 47 (wiping direction D3 indicated in FIG. 2) while being pressed against the discharge surface 47. Through the above movement, the blade 92 removes adhering ink. The wiping direction D3 herein refers to a direction along the discharge surface 47. The cleaning method according to the present embodiment has been described so far with reference to FIGS. 1 and 2. Note that the purging, the supplying, and the wiping may be performed in stated order in the cleaning method illustrated in FIGS. 1 and 2.

[Image Forming Method According to Present Embodiment]

An image forming method according to the present embodiment includes discharging, supplying, purging, and wiping. The discharging and the supplying are the same as those described above in <Supplying>. The purging and the wiping are the same as those described above in <Purging and Wiping>. Therefore, an image can be formed according to the image forming method according to the present embodiment without involving occurrence of ink discharge failure even in restart of ink discharge.

[Examples of Materials of Water-Based Cleaning Liquid]

As described above, the water-based cleaning liquid contains the nonionic surfactant A, the deliquescent agent, and the pH adjuster. Preferably, the water-based cleaning liquid further contains at least one of an aqueous solvent and a solution stabilizer.

<Nonionic Surfactant A>

The nonionic surfactant A contains polyoxyalkylene alkylamine. The polyoxyalkylene alkylamine preferably has a structure represented by the following formula (1-1). For example, "PUREMEEL (registered Japanese trademark) EP-300S" produced by Sanyo Chemical Industries, Ltd. can be used as the polyoxyalkylene alkylamine.

(1-1)

In the formula (1-1), $R^1$ represents a hydrocarbon group having a carbon number of at least 8 and no greater than 24. Preferably, $R^1$ represents an alkyl group or an alkenyl group having a carbon number of at least 8 and no greater than 24. $A^1O$ and $A^2O$ each represent, independently of one another, at least one of an oxyethylene group and an oxypropylene group. Further, m1 and n1 each represent a number that is larger than 0 and that satisfies $0.5 \leq (m1+n1) \leq 100$. Preferably, m1 and n1 each represent a number that satisfies $1 \leq (m1+n1) \leq 40$.

The content of the nonionic surfactant A in the water-based cleaning liquid is at least 0.10% by mass and no greater than 10.00% by mass. When the content of the nonionic surfactant A in the water-based cleaning liquid is at least 0.10% by mass, a certain amount of the water-based cleaning liquid permeating among adjacent pigment particles (also referred to below as a "permeation amount of the water-based cleaning liquid") can be ensured. Accordingly, a certain amount of the purged ink permeating among adjacent pigment particles (also referred to below as a "permeation amount of the purged ink) can be ensured. The content of the nonionic surfactant A in the water-based cleaning liquid is preferably at least 0.50% by mass.

When the content of the nonionic surfactant A in the water-based cleaning liquid is no greater than 10.00% by mass, separation of the water-based cleaning liquid into a component containing the nonionic surfactant A and a component not containing the nonionic surfactant A can be inhibited. Through the above, function impairment of the water-based cleaning liquid can be inhibited. The content of the nonionic surfactant A in the water-based cleaning liquid is preferably no greater than 7.00% by mass. In a configuration in which the water-based cleaning liquid contains two or more nonionic surfactant As, the sum of the contents of the respective nonionic surfactant As in the water-based cleaning liquid is preferably at least 0.10% by mass and no greater than 10.00% by mass.

Incidentally, cationic surfactants, anionic surfactants, and zwitterionic surfactants are known as surfactants in addition to nonionic surfactants. However, the water-based cleaning liquid in the present embodiment contains a nonionic surfactant (more specifically, the nonionic surfactant A) among the cationic surfactants, the anionic surfactants, the zwitterionic surfactants, and the nonionic surfactants. Containing the nonionic surfactant can reduce effervescence of the water-based cleaning liquid. A low-harm water-based cleaning liquid can be provided.

<Deliquescent Agents>

The deliquescent agent includes at least one of sorbitol, trimethylolpropane, and 1,3-bis(2-hydroxyethyl)-5,5-dimethylhydantoin. In the above configuration, the deliquescent agent is not chargeable and not a polysaccharide. As such, an advantage of preventing occurrence of ink discharge failure can be straightforwardly achieved even in restart of ink discharge.

Specifically, when the resin covers come in contact with a liquid containing an aqueous solvent (for example, a water-based cleaning liquid), ionization tends to readily occur on the surfaces of the resin covers (see <Typical Configuration of Water-based Ink> above). Therefore, use of a charged deliquescent agent (chargeable deliquescent agent) as a deliquescent agent may generate electric attraction between the deliquescent agent (chargeable deliquescent agent) and the surfaces of the resin covers. Consequently, the purged ink may less permeate. However, use of the deliquescent agent as above, which is not chargeable, can prevent occurrence of such a drawback.

Moreover, use of a polysaccharide as the deliquescent agent increases the viscosity of the water-based cleaning liquid. It is accordingly difficult to ensure a certain permeation amount of the water-based cleaning liquid. Consequently, it is difficult to ensure a certain permeation amount of the purged ink. However, use of the deliquescent agents, which is not a polysaccharide, can prevent occurrence of such a drawback.

The content of the deliquescent agent in the water-based cleaning liquid is at least 0.50% by mass and no greater than 30.00% by mass. When the content of the deliquescent agent in the water-based cleaning liquid is art least 0.50% by mass, a certain amount of the purged ink absorbed in the water-based cleaning liquid (specifically, the deliquescent agent contained in the water-based cleaning liquid) can be ensured. A certain permeation amount of the purged ink can accordingly be ensured. The content of the deliquescent agent in the water-based cleaning liquid is preferably at least 0.70% by mass.

When the content of the deliquescent agent in the water-based cleaning liquid is no greater than 30.00% by mass, the viscosity of the water-based cleaning liquid can be held low. A certain permeation amount of the water-based cleaning liquid can be ensured as a result, and a certain permeation amount of the purged ink can be eventually ensured. The content of the deliquescent agent in the water-based cleaning liquid is preferably no greater than 10.00% by mass. In a configuration in which the water-based cleaning liquid contains two or more deliquescent agents, the sum of the contents of the respective deliquescent agents in the water-based cleaning liquid is preferably at least 0.50% by mass and no greater than 30.00% by mass.

<pH Adjuster>

The pH adjuster includes an alkali metal salt. The content of the pH adjuster in the water-based cleaning liquid is preferably determined so that the water-based cleaning liquid has a pH of at least 7.5 and no greater than 8.5.

The alkali metal salt is preferably a hydroxide of an alkali metal and more preferably includes at least one of sodium hydroxide and potassium hydroxide <Aqueous Solvent>

The aqueous solvent contained in the water-based cleating liquid preferably contains water. More preferably, the aqueous solvent contained therein contains water and either or both a polyalcohol and glycol ether.

(Water)

The content of the water in the water-based cleaning liquid is preferably at least 20% by mass and no greater than 70% by mass. When the content of the water falls in the above range, a water-based cleaning liquid having appropriate viscosity can be provided. Ion-exchanged water is preferable as the water contained in the aqueous solvent of the water-based cleaning liquid.

(Polyalcohol)

The polyalcohol preferably includes at least one of glycerin and glycol. More preferably, the polyalcohol is glycerin. When the aqueous solvent of the water-based cleaning liquid contains glycerin, the water-based cleaning liquid can be further prevented from being dried. The content of glycerin in the water-based cleaning liquid is preferably at least 5% by mass and no greater than 20% by mass. When the content of the glycerin falls in the above range, a water-based cleaning liquid having appropriate viscosity can be provided.

(Glycol Ether)

Examples of the glycol ether include diethylene glycol monoethyl ether, triethylene glycol mono-n-butyl ether, triethylene glycol monoisobutyl ether, triethylene glycol monoisopropyl ether, and diethylene glycol mono-n-butyl ether.

<Solution Stabilizer>

When the water-based cleaning liquid contains a solution stabilizer, components contained in the water-based cleaning liquid tend to be compatible and the water-based cleaning liquid can accordingly be in a stable dissolved state. The solution stabilizer preferably includes at least one of 2-pyrrolidone, N-methyl-2-pyrrolidone, and γ-butyrolactone. The content of the solution stabilizer in the water-based cleaning liquid is preferably at least 1% by mass, and no greater than 20% by mass and more preferably at least 3% by mass and no greater than 15% by mass.

[Preferable Production Method of Water-Based Cleaning Liquid]

A preferable production method of the water-based cleaning liquid includes evenly mixing materials (for example, the nonionic surfactant A, the deliquescent agent, and the pH adjuster) at a specific blending ratio. Preferably, the materials are mixed using a stirrer (for example, "THREE-ONE MOTOR (registered Japanese trademark) BL-600" produced by Shinto Scientific Co., Ltd.).

EXAMPLES

The following describes examples of the present disclosure. Note that unless otherwise stated, evaluation results (for example, values indicating shape or physical properties) of a powder including a plurality of particles are number averages of values measured with respect to an appropriate number of the particles. In evaluations in which errors may occur, an evaluation value was calculated by calculating the arithmetic mean of an appropriate number of measured values in order to ensure that any errors were sufficiently small.

Water-based cleaning liquids according to Examples and Comparative Examples were used for evaluation in Evaluations 1 to 3 as to attachment or non-attachment of water-based inks on nozzle surfaces (corresponding to a discharge surface of a recording head), ink placement accuracy of the water-based inks, and stability of pigment particles against a water-based cleaning liquid. The water-based cleaning liquids are produced according to the same method in Evaluations 1 to 3 in all aspect other than constituents of the water-based cleaning liquids. Furthermore, the same water-based cleaning liquid evaluation method was employed in Evaluations 1 to 3. As such, the following describes the aspects of the water-based cleaning liquid production method common among Evaluations 1 to 3 first and then water-based cleaning liquid evaluation methods. Evaluations 1 to 3 will be described then in order.

[Aspects of Water-Based Cleaning Liquid Production Method Common Among Evaluations 1 to 3]

Table 1 indicates constituents of the water-based cleaning liquids.

Specifically, the materials listed in Table 1 in the respective amounts indicated in Table 1 were added to a beaker. The beaker contents were stirred at a rotational speed of 400 rpm using a stirrer ("THREE-ONE MOTOR BL-600" produced by Shinto Scientific Co., Ltd.) to evenly mix the beaker contents. Through the above, water-based cleaning liquids were obtained. Note that materials and amount X of the deliquescent agent, materials and amount Y of the surfactant, and materials and amount Z of the pH adjuster will be indicated in Evaluations 1 to 3 described later.

TABLE 1

| Water-based cleaning liquid | |
|---|---|
| Material | Amount (% by mass) |
| 2-pyrrolidone | 10.0 |
| Deliquescent agent | X |
| Surfactant | Y |

TABLE 1-continued

| Water-based cleaning liquid | |
|---|---|
| Material | Amount (% by mass) |
| pH adjuster | Z |
| Glycerin | 10.0 |
| Ion-exchanged water | Remainder |
| Total | 100.0 |

[Evaluation Methods]

The water-based cleaning liquids were evaluated using four colored water-based inks and an evaluation apparatus. The following describes production methods of the respective four colored water-based inks, an evaluation apparatus preparing method, and water-based cleaning liquid evaluation methods in stated order.

<Production Methods of Water-Based Inks>

Constituents of a pigment dispersion L1 used in water-based ink production are listed in Table 2. In Table 2, "Resin A-Na" refers to a resin A neutralized with an aqueous solution of sodium hydroxide (NaOH). Also, "Pigment" refers to any one of a cyan pigment, a yellow pigment, a magenta pigment, and a black pigment. The following mainly focuses on a production method of a water-based ink containing the cyan pigment (cyan colored ink). In a situation in which it is unnecessary to distinguish the color of the water-based inks, the water-based inks will be each referred simply to below as a "water-based ink" or an "ink".

TABLE 2

| Pigment dispersion L1 | |
|---|---|
| Material | Amount (% by mass) |
| Ion-exchanged water | Remainder |
| Resin A-Na | 6.0 |
| Pigment | 15.0 |
| 1,2-Octanediol | 0.5 |
| Total | 100.0 |

Constituents of the water-based ink are listed in Table 3. In Table 3, "EO adduct of acetylenediol" refers to "OLFINE (registered Japanese trademark) E1010" produced by Nissin Chemical industry Co., Ltd. and "EO" refers to ethylene oxide.

TABLE 3

| Water-based ink | |
|---|---|
| Material | Amount (% by mass) |
| Pigment dispersion L1 | 40.0 |
| Triethylene glycol mono-n-butyl ether | 3.0 |
| 2-Pyrrolidone | 5.0 |
| EO adduct of acetylenediol | 0.5 |
| 1,2-Octanediol | 0.7 |
| 1,3-Propanediol | 15.0 |
| Ion-exchanged water | Remainder |
| Total | 100.0 |

(Synthesis of Resin A)

The resin A was synthesized first. Specifically, a stirrer, a nitrogen inlet tube, a condenser, and a dripping funnel were set at a four-necked flask (capacity: 1,000 mL). Next, 100.0 g of isopropyl alcohol and 300.0 g of methyl ethyl ketone were added to the flask. The flask contents were refluxed by heating at 70° C. under bubbling with nitrogen gas.

Separately, 40.0 g of styrene, 10.0 g of methacrylic acid, 40.0 g of methyl methacrylate, 10.0 g of butyl acrylate, and 0.4 g of azobisisobutyronitrile (AIBN, polymerization initiator) were mixed together to obtain a monomer solution. The monomer solution was added to the flask dropwise over approximately two hours while the flask contents were refluxed by heating at 70° C. After the dripping, the flask contents were refluxed by heating at 70° C. for additional six hours.

A solution containing 0.2 g of AIBN and methyl ethyl ketone was added to the flask dropwise over 15 minutes. After the dripping, the flask contents were refluxed by heating at 70° C. for additional five hours. Through the above process, the resin A (styrene-acrylic acid-based resin) was obtained. The resultant resin A had a mass average molecular weight (Mw) of 20,000 and an acid value of 100 mgKOH/g.

The mass average molecular weight Mw of the resin A was measured under the following conditions using a gel filtration chromatography ("HLC-8020GPC" produced by Tosoh Corporation).
Columns: "TSKgel Super Multipore HZ-H" produced by Tosoh Corporation (semi-micron columns each having an inner diameter of 4.6 mm and a length of 15 cm).
Number of columns: three.
Eluent: tetrahydrofuran.
Flow rate: 0.35 mL/min.
Sample amount: 10 µL.
Temperature at measurement: 40° C.
Detector: infrared detector.

Seven TSKgel standard polystyrenes produced by Tosoh Corporation, namely F-40, F-20, F-4, F-1, A-5000, A-2500, and A-1000, and n-propylbenzene were selected to prepare calibration curves.

The acid value of the resin A was determined in accordance with a method described in "Japan Industrial Standard (JIS) K0070-1992 (Test methods for acid value, saponification value, ester value, iodine value, hydroxyl value, and unsaponifiable matter of chemical products)".

(Preparation of Pigment Dispersion L1)

Next, the pigment dispersion L1 was prepared with the use of the synthesized resin A. Specifically, 6.0% by mass of the resin A, 15.0% by mass of Phthalocyanine Blue 15:3, 0.5% by mass of 1,2-octanediol, and ion-exchanged water were loaded into a vessel (capacity: 0.6 L) of a media disperser ("DYNO-MILL" produced by Willy A. Bachofen AG (Willy A. Bachofen AG)).

Furthermore, an aqueous solution of sodium hydroxide of which amount is an amount necessary to neutralize the resin A was added to the vessel. The aqueous solution of NaOH was added to the vessel to set the pH of the vessel contents at 8. More specifically, a mass of the aqueous solution of NaOH that was 1.1 times a neutralization equivalent was added to the vessel. In determining the amounts of the respective materials of the pigment dispersion solution L, the mass of Na to be added to the vessel was added to the mass of the resin A. The mass of water contained in the aqueous solution of NaOH and the mass of water generated through neutralization reaction were added to the mass of ion-exchanged water.

A medium (zirconia heads having a diameter of 0.5 mm) was loaded into the vessel until the amount of the medium was 70% by volume relative to the capacity of the vessel. The vessel contents were kneaded using the media disperser while the vessel was water-cooled under conditions of a temperature of 10° C. and a peripheral speed of 8 m/sec. so that pigment particles had a volume median diameter ($D_{50}$) of at least 70 nm and no greater than 130 nm. Through the above process, the pigment dispersion L1 was obtained.

The volume median diameter ($D_{50}$) of the pigment particles was measured based on Coulter principle (electrical sensing zone technique) using "Coulter Counter Multisizer 3" produced by Beckman Coulter, Inc.

(Mixing of Pigment Dispersion L1 with Additional Ink Component)

The materials listed in Table 3 in the respective amounts indicated in Table 3 were added to a beaker. The beaker contents were stirred at a rotational speed of 400 rpm using a stirrer ("THREE-ONE MOTOR BL-600" produced by Shinto Scientific Co., Ltd.) to be evenly mixed. The resultant mixed liquid was filtered using a filter (pore diameter: 5 µm) to remove foreign matter and coarse particles contained in the mixed liquid. Through the above process, the cyan colored water-based ink was obtained.

A yellow colored water-based ink was produced using C. I. Pigment Yellow 74 that is a pigment. Also, a magenta colored water-based ink was produced using Quinacridone Magenta (PR122) that is a pigment. A black colored water-based ink was produced using carbon black that is a pigment.

<Evaluation Apparatus Preparing Method>

An evaluation apparatus used was an inkjet recording apparatus (prototype apparatus produced by KYOCERA Document Solutions Inc.) including four recording heads (four line heads). The recording heads used each were a piezoelectric head (product of KONICA MINOLTA JAPAN, INC.) including 512 nozzles (=256×2 rows) and having a resolution of 360 dpi (=180 dpi×2 rows), a droplet amount of 14 pL, and a driving frequency of 12.8 kHz. The recording heads are 20 mm spaced apart from each other in a conveyance direction of a sheet so that the longitudinal direction thereof is perpendicular to the conveyance direction of a sheet. The water-based inks produced according to the aforementioned methods were loaded into the respective recording heads. More specifically, the water-based inks different in color from one another were loaded into the respective four recording heads. The evaluation apparatus was adjusted such that a negative suction pressure was set at 380 Pa below the most upstream recording head and the most downstream recording head and at 280 Pa below the other two recording heads. Further, the nozzle surfaces had been cleaned and therefore were not contaminated with ink.

<Evaluation as to Attachment or Non-Attachment of Water-Based Inks to Nozzle Surfaces>

A printing durability test was performed using the evaluation apparatus prepared as above. The printing durability test was performed under a condition of a conveyance speed of 350 mm/sec. in an environment at a temperature of 25° C. and a relative humidity of 60% RH. In the printing durability test, printing of solid images (size: 10 cm×10 cm, coverage rate: 100%) different in color from one another in a superposed manner was consecutively performed on 5000 recording sheets ("C$^2$" produced by Fuji Xerox Co., Ltd., A4-size plain paper).

After the printing durability test, a water-based cleaning liquid (each of the water-based cleaning liquid of Examples and Comparative Examples) was supplied to the nozzle surfaces. The purging operation and the wiping operation were performed then. The nozzle surfaces were observed using an optical microscope to check the presence or absence of ink contamination on the nozzle surfaces.

Excellent: No ink contamination was observed on the nozzle surfaces.

Good: Ink contamination was hardly observed on the nozzle surfaces.

Poor: Ink contamination was apparently observed on the nozzle surfaces.

<Evaluation of Ink Placement Accuracy of Water-Based Ink>

According to the following method, ink placement accuracy of the water-based inks directly after supply of a water-based cleaning liquid (each of the water-based cleaning liquids of Examples and Comparative Examples) and that after three-day standing still of the evaluation apparatus were measured.

First, an initial ink placement accuracy (3σ value) was obtained.

Next, the printing durability test, supply of the water-cleaning liquid, the purging operation, and the wiping operation were performed in stated order in accordance with the method described above in <Evaluation as to Attachment or Non-attachment of Water-based Ink to Nozzle Surface>. The ink placement accuracy (3σ value) directly after the wiping operation was obtained. The ink placement accuracy (3σ value) obtained as above is referred to as a "ink placement accuracy (3σ value) after the printing durability test".

When a difference between the initial ink placement accuracy (3σ value) and the ink placement accuracy (3σ value) after the printing durability test was less than 3, the ink placement accuracy of the water-based inks directly after supply of a water-based cleaning liquid was evaluated as good. By contrast, when a difference between the initial ink placement accuracy (3σ value) and the ink placement accuracy (3σ value) after the printing durability test was no less than 3, the ink placement accuracy of the water-based inks directly after supply of a water-based cleaning liquid was evaluated as poor.

Furthermore, the printing durability test, supply of the water-cleaning liquid, the purging operation, and the wiping operation were performed in stated order in accordance with the method described above in <Evaluation as to Attachment or Non-attachment of Water-based Inks to Nozzle Surface>. The evaluation apparatus was then left to stand for three days. Thereafter, an ink placement accuracy (3σ value) was obtained. The ink placement accuracy (3σ value) obtained as above is referred to as an "ink placement accuracy (3σ value) after standing still.

When a difference between the initial ink placement accuracy (3σ value) and the ink placement accuracy (3σ value) after standing still was less than 3, the ink placement accuracy of the water-based inks after three-day standing still was evaluated as good. By contrast, when a difference between the initial ink placement accuracy (3σ value) and the ink placement accuracy (3σ value) after standing still was no less than 3, the ink placement accuracy of the water-based inks after three-day standing still was evaluated as poor.

The ink placement accuracy (3σ value) was obtained in accordance with the following method. Specifically, the water-based inks each are discharged from the nozzles of a corresponding one of the four recording heads toward a recording sheet in a state in which the recording sheet was not conveyed (stamping method), thereby forming one dot per a nozzle. Next, the ink placement accuracy 3σ of each of the dots formed on the recording sheet was measured using a general purpose image processing system ("DA-6000" produced by Oji Scientific Instruments Co., Ltd.). The arithmetic mean of the resultant measurement data (ink placement accuracy 3σ of each dot) was determined as an ink placement accuracy (3σ value).

The ink placement accuracy 3σ refers to an ink placement accuracy expressed by an expression "3σ=3√(σx2+σy2)". In the expression, σx represents a standard deviation in positional shift amount in the X direction from a designed nozzle position. Also, σy represents a standard deviation in positional shift amount in the Y direction from a designed nozzle position.

<Evaluation of Stability of Pigment Particles Against Water-Based Cleaning Liquid>

First, the volume median diameter ($D_{50}$) of the pigment particles contained in the water-based ink was measured in an environment of 25° C. using a dynamic light scattering type particle size distribution analyzer ("Zetasizer Nano ZS" produced by Sysmex Corporation). The volume median diameter ($D_{50}$) of the pigment particles measured as above is referred to as an initial volume median diameter ($D_{50}$).

Next, a mixed liquid of the water-based ink and any of the water-based cleaning liquids was added to a vessel (capacity: 300 mL). The mixed liquid had a volume ratio of the water-based ink relative to the water-based cleaning liquid of 1:100. The vessel was then placed in a thermostatic chamber set at a temperature of 60° C. for 24 hours. The vessel was then taken out from the thermostatic chamber and left to stand until the temperature of the vessel contents was decreased to 25° C. The volume median diameter ($D_{50}$) of the pigment particles in the vessel was measured then using the dynamic light scattering type particle size distribution analyzer ("Zetasizer Nano ZS" produced by Sysmex Corporation). The volume median diameter ($D_{50}$) of the pigment particles measured as above is referred to as a post-mixing volume median diameter ($D_{50}$).

The increasing rate of the volume median diameter ($D_{50}$) of the pigment particles was calculated using the following expression. When an increasing rate of the volume median diameter ($D_{50}$) of the pigment particles was less than 5%, stability of the pigment particles against a water-based cleaning liquid was evaluated as good. By contrast, when an increasing rate of the volume median diameter ($D_{50}$) of the pigment particles was at least 5%, stability of the pigment particles against a water-based cleaning liquid was evaluated as poor.

(Increasing rate of volume median diameter ($D_{50}$) of pigment particles)=[(post-mixing volume median diameter ($D_{50}$))−(initial volume median diameter ($D_{50}$))]×100/(initial volume median diameter ($D_{50}$))

[Evaluation 1]

Water-based cleaning liquids C-1 to C-5 were evaluated in Evaluation 1. Table 4 indicates constituents and evaluation results of the respective water-based cleaning liquids C-1 to C-5.

The respective amounts in Table 4 are indicated in terms of percent by mass. Materials "Y-a", "Y-h", "Y-c", and "Y-d" each represent a corresponding one of the materials listed in Table 5. The pH of each of the water-based cleaning liquids C-1 to C-5 was measured using a meter ("D-51" produce by HORIBA, Ltd.).

Evaluation results as to attachment or non-attachment of the water-based inks to the nozzle surfaces are listed in "Attachment or non-attachment of water-based inks". Evaluation results as to ink placement accuracy of the water-based inks directly after water-based cleaning liquid supply are listed in "Directly after supply". Also, evaluation results as to ink placement accuracy of the water-based inks after three-day standing still are listed in "After standing still". Evaluation results as to stability of pigment particles against each water-based cleaning liquid are listed in "Stability of pigment particles".

TABLE 4

|  |  | Example | Comparative Example | | | |
|---|---|---|---|---|---|---|
|  |  | 1 | 1 | 2 | 3 | 4 |
| Water-based cleaning liquid | | C-1 | C-2 | C-3 | C-4 | C-5 |
| Deliquescent agent | Material | | | Sorbitol | | |
|  | Amount X | | | 3.00 | | |
| Surfactant | Material | Y-a | Y-b | Y-c | Y-d | — |
|  | Amount Y | | 1.00 | | | 0.00 |
| pH adjuster | Material | | | NaOH | | |
|  | Amount Z | 0.05 | 0.05 | 0.00 | 0.00 | 0.05 |
|  | pH | 8.30 | 8.30 | 8.40 | 8.10 | 9.00 |
| Evaluation result | | | | | | |
| Attachment or non-attachment of water-based inks | | Excellent | Excellent | Poor | Poor | Poor |
| Ink placement accuracy of water-based inks | Directly after supply | Good | Poor | Poor | Poor | Poor |
|  | After standing still | Good | Good | Good | Good | Poor |
| Stability of pigment particles | | Good | Good | Poor | Poor | Good |

TABLE 5

| | Materials of surfactant |
|---|---|
| Y-a | Polyoxyalkylene alkylamine ("PUREMEEL EP-300S") produced by Sanyo Chemical Industries, Ltd.) |
| Y-b | Dimethyl lauryl amine oxide (active ingredient 35%) |
| Y-c | EO adduct of acetylenediol ("OLFINE E1010" produced by Nissin Chemical Industry Co., Ltd.) |
| Y-d | EO adduct of tetramethyldecynediol ("SURFYNOL (registered Japanese trademark) 485" produced by Nissin Chemical Industry Co., Ltd.) |

The respective water-based cleaning liquids C-1 to C-4 contained surfactants different from one another. Specifically, the water-based cleaning liquid C-1 contained polyoxyalkylene alkylamine. By contrast, the water-based cleaning liquid C-2 contained dimethyl lauryl amine oxide. The dimethyl lauryl amine oxide herein was a zwitterionic surfactant. The water-based cleaning liquid C-3 contained the EO adduct of acetylenediol but did not contain polyoxyalkylene alkylamine. The water-based cleaning liquid C-4 contained an EO adduct of tetramethyldecynediol but did not contain polyoxyalkylene alkylamine. The water-based cleaning liquid C-5 contains no surfactant.

The water-based cleaning liquids C-1 to C-5 each contained sorbitol as the deliquescent agent. The amounts X of sorbitol contained in the respective water-based cleaning liquids C-1 to C-5 each were 3.00% by mass. The water-based cleaning liquids C-1 to C-5 each had a pH as listed in Table 4. The water-based cleaning liquid C-1, C-2, and C-5 contained NaOH as the pH adjuster. The amounts Z of NaOH contained in the respective water-based cleaning liquids C-1, C-2, and C-5 were as listed in Table 4. The respective amounts Z of NaOH each were determined according to the materials of a corresponding one of the surfactants. Change in material of a surfactant changes the pH of a corresponding water-based cleaning liquid. In view of the foregoing, the amounts Z of NaOH were determined so that the water-based cleaning liquid each had a specific pH.

[Evaluation 2]

Water-based cleaning liquids C-1 and C-5 to C-8 were evaluated in Evaluation 2. Table 6 indicates constituents and evaluation results of the respective water-based cleaning liquids C-1 and C-5 to C-8.

The respective amounts in Table 6 are indicated in terms of percent by mass. Further, "Y-a" represents a material as listed in Table 5. The pH of each of the water-based cleaning liquids C-1 and C-5 to C-8 was measured using a pH meter ("D-51" produce by HORIBA, Ltd.).

Evaluation results as to attachment or non-attachment of the water-based inks to the nozzle surfaces are listed in "Attachment or non-attachment of water-based inks". Evaluation results as to ink placement accuracy of the water-based inks directly after water-based cleaning liquid supply are listed in "Directly after supply". Also, evaluation results as to ink placement accuracy of the water-based inks after three-day standing still are listed in "After standing still". Evaluation results as to stability of the pigment particles against each water-based cleaning liquid are listed in "Stability of pigment particles".

The water-based cleaning liquid C-8 could not be evaluated. Specifically, the amount Y of the surfactant Y-a contained in the water-based cleaning liquid C-8 was 15.00% by mass. The water-based cleaning liquid C-8 having the above configuration separated into a component containing the surfactant Y-a and a component not containing the surfactant Y-a. The above separation accordingly disabled the water-based cleaning liquid C-8 from being used to clean the nozzle surfaces.

TABLE 6

|  |  | Example | | | Comparative Example | |
|---|---|---|---|---|---|---|
|  |  | 1 | 2 | 3 | 4 | 5 |
| Water-based cleaning liquid | | C-1 | C-6 | C-7 | C-5 | C-8 |
| Deliquescent agent | Material | | | Sorbitol | | |
| | Amount X | | | 3.00 | | |
| Surfactant | Material | | Y-a | | — | Y-a |
| | Amount Y | 1.00 | 0.10 | 10.00 | 0.00 | 15.00 |
| pH adjuster | Material | | | NaOH | | |
| | Amount Z | 0.05 | 0.01 | 0.10 | 0.05 | 0.15 |
| pH | | 8.30 | 7.80 | 8.50 | 9.00 | 8.70 |
| Evaluation result | | | | | | |
| Attachment or non-attachment of water-based inks | | Excellent | Good | Excellent | Poor | — |
| Ink placement accuracy of water-based inks | Directly after supply | Good | Good | Good | Poor | — |
| | After standing still | Good | Good | Good | Poor | — |
| Stability of pigment particles | | Good | Good | Good | Good | — |

The amounts Y of the surfactant Y-a in the respective water-based cleaning liquids C-1 and C-5 to C-8 were different from one another. Specifically, the amounts Y of the surfactant Y-a contained in the respective water-based cleaning liquids C-1, C-6, and C-7 were 1.00% by mass, 0.10% by mass, and 10.00% by mass, respectively. By contrast, the water-based cleaning liquid C-5 contained no surfactant. Furthermore, the amount Y of the surfactant Y-a contained in the water-based cleaning liquid C-8 was 15.00% by mass.

The water-based cleaning liquids C-1 and C-5 to C-8 each contained sorbitol as the deliquescent agent. The amount X of sorbitol in each of the water-based cleaning liquids C-1 and C-5 to C-8 was 3.00% by mass. The water-based cleaning liquids C-1 and C-5 to C-8 each had a pH as listed in Table 6. The water-based cleaning liquid C-1 and C-5 to C-8 each contained NaOH as the pH adjuster. The amounts Z of NaOH contained in the respective water-based cleaning liquids C-1 and C-5 to C-8 were as listed in Table 6. The amounts Z of NaOH each were determined according to a corresponding one of the amounts Y of the surfactant Y-a. Change in the amount Y of the surfactant Y-a changes the pH of a corresponding one of the water-based cleaning liquids. In view of the foregoing, the amounts Z of NaOH were determined so that the water-based cleaning liquids each had a specific pH.

[Evaluation 3]

Water-based cleaning liquids C-1 and C-9 to C-12 were evaluated in Evaluation 3. Table 7 indicates constituents and evaluation results of the respective water-based cleaning liquids C-1 and C-9 to C-12.

The respective amounts in Table 7 are indicated in terms of percent by mass. Further, "X-a" represents sorbitol. Also, "Y-a" represents a material listed in Table 5. The pH of each of the water-based cleaning liquids C-1 and C-9 to C-12 was measured using a pH meter ("D-51" produce by HORIBA, Ltd.).

Evaluation results as to attachment or non-attachment of the water-based inks to the nozzle surfaces are listed in "Attachment or non-attachment of water-based inks". Evaluation results as to ink placement accuracy of the water-based inks directly after water-based cleaning liquid supply are listed in "Directly after supply". Also, evaluation results as to ink placement accuracy of the water-based inks after three-day standing still are listed in "After standing still". Evaluation results as to stability of pigment particles against each water-based cleaning liquid are listed in "Stability of pigment particles".

Water-based cleaning liquids containing trimethylolpropane or 1,3-bis(2-hydroxyethyl)-5,5-dimethylhydantoin in place of sorbitol (deliquescent agent X-a indicated in Table 7) were produced and evaluated in addition. Evaluation results thereof each showed a similar tendency to those listed in Table 7.

TABLE 7

|  |  | Example | | | Comparative Example | |
|---|---|---|---|---|---|---|
|  |  | 1 | 4 | 5 | 6 | 7 |
| Water-based cleaning liquid | | C-1 | C-9 | C-10 | C-11 | C-12 |
| Deliquescent agent | Material | | X-a | | — | X-a |
| | Amount X | 3.00 | 30.00 | 0.50 | 0.00 | 40.00 |
| Surfactant | Material | | | Y-a | | |
| | Amount Y | | | 1.00 | | |
| pH adjuster | Material | | | NaOH | | |
| | Amount Z | | | 0.05 | | |
| pH | | 8.30 | 8.40 | 8.30 | 8.40 | 8.40 |
| Evaluation result | | | | | | |
| Attachment or non-attachment of water-based inks | | Excellent | Excellent | Excellent | Good | Good |
| Ink placement accuracy of water-based inks | Directly after supply | Good | Good | Good | Good | Poor |
| | After standing still | Good | Good | Good | Poor | Poor |

The amounts X of the deliquescent agent in the respective water-based cleaning liquids C-1 and C-9 to C-12 were different from one another. Specifically, the amounts X of sorbitol in the respective water-based cleaning liquids C-1, C-9, and C-10 were 3.00% by mass, 30.00% by mass, and 0.50% by mass, respectively. By contrast, the water-based cleaning liquid C-11 contained no deliquescent agent. The amount X of sorbitol in the water-based cleaning liquid C-12 was 40.00% by mass.

The water-based cleaning liquids C-1 and C-9 to C-12 each contained the surfactant Y-a. The amounts Y of the surfactant Y-a in the respective water-based cleaning liquids C-1 and C-9 to C-12 each were 1.00% by mass. The water-based cleaning liquids C-1 and C-9 to C-12 each had a pH as listed in Table 7. The water-based cleaning liquids C-1 and C-9 to C-12 each contained NaOH as the pH adjuster. The amounts X of NaOH in the respective water-based cleaning liquids C-1 and C-9 to C-12 each were 0.05% by mass.

In Evaluations 1 to 3 as above, the water-based cleaning liquids of Examples 1 to 5 each contained at least 0.10% by mass and no greater than 10.00% by mass of the nonionic surfactant, at least 0.50% by mass and no greater than 30.00% by mass of the deliquescent agent, and the pH adjuster. The nonionic surfactant was polyoxyalkylene alkylamine. The deliquescent agent was at least one of sorbitol, trimethylolpropane, and 1,3-bis(2-hydroxyethyl)-5,5-dimethylhydantoin. The pH adjuster was an alkali metal salt. The water-based cleaning liquids of Examples 1- to 5 each had a pH of at least 7.5 and no greater than 8.5. In the above configuration, less or no ink contamination was observed on the nozzle surfaces after the nozzle surfaces were cleaned with any of the water-based cleaning liquids according to Examples 1 to 5. Furthermore, high ink placement accuracy of the water-based inks could be maintained even after three days from supply of the respective water-based cleaning liquids according to Examples 1 to 5 to the discharge surfaces. Yet, expansion of the pigment particles could be inhibited even in a state in which the water-based ink was mixed with any of the water-based cleaning liquid of Examples 1 to 5.

What is claimed is:

1. A water-based cleaning liquid for inkjet recording apparatus use comprising:
    at least 0.10% by mass and no greater than 10.00% by mass of a nonionic surfactant;
    at least 0.50% by mass and no greater than 30.00% by mass of a deliquescent agent; and
    a pH adjuster, wherein
    the nonionic surfactant contains polyoxyalkylene alkylamine,
    the deliquescent agent includes at least one of sorbitol, trimethylolpropane, and 1,3-bis(2-hydroxyethyl)-5,5-dimethylhydantoin,
    the pH adjuster includes an alkali metal salt,
    the water-based cleaning liquid for inkjet recording apparatus use has a pH of at least 7.5 and no greater than 8.5, and
    wherein the polyoxyalkylene alkylamine has a structure represented by the following formula (1-1), where in the formula (1-1), $R^1$ represents a hydrocarbon group having a carbon number of at least 8 and no greater than 24, $A^1O$ and $A^2O$ each represent, independently of one another, at least one of an oxyethylene group and an oxypropylene group, and m1 and n1 each represent a number that is greater than 0 and that satisfies $0.5 \leq (m1+n1) \leq 100$.

2. The water-based cleaning liquid for inkjet recording apparatus use according to claim 1, wherein
    in the formula (1-1), $R^1$ represents an alkyl group or an alkenyl group having a carbon number of at least 8 and no greater than 24 and m1 and n1 each represent a number satisfying $1 \leq (m1+n1) \leq 40$.

3. The water-based cleaning liquid for inkjet recording apparatus use according to claim 1, wherein
    the alkali metal salt includes at least one of sodium hydroxide and potassium hydroxide.

4. The water-based cleaning liquid for inkjet recording apparatus use according to claim 1, further comprising a polyalcohol, wherein
    the polyalcohol includes glycerin.

5. The water-based cleaning liquid for inkjet recording apparatus use according to claim 1, which wherein
    the water-based cleaning liquid for inkjet recording apparatus use is used to clean a discharge surface of a recording head included in an inkjet recording apparatus, and
    the discharge surface is a surface from which a water-based ink for inkjet recording has been discharged.

6. A cleaning method for cleaning a discharge surface of a recording head included in an inkjet recording apparatus, comprising:
    supplying the water-based cleaning liquid for inkjet recording apparatus use according to claim 1 to the discharge surface;
    performing purging in a manner that a water-based ink for inkjet recording is pressurized to be discharged from the discharge surface; and
    wiping the discharge surface, wherein
    the discharge surface is a surface from which the water-based ink for inkjet recording has been discharged, and
    the supplying and the performing purging are performed before the wiping.

* * * * *